Dec. 12, 1967

G. R. KNIGHT, JR., ET AL 3,357,195

LIQUEFIED GAS TANKER

Filed April 25, 1966

INVENTORS
George R. Knight, Jr.,
Norman W. Penney,
Thomas F. Bridges

BY Stevens, Davis, Miller & Mosher
ATTORNEYS

Dec. 12, 1967    G. R. KNIGHT, JR., ET AL    3,357,195
LIQUEFIED GAS TANKER
Filed April 25, 1966    2 Sheets-Sheet 2

INVENTORS
George R. Knight, Jr.,
Norman W. Penney,
Thomas F. Bridges
BY Stevens, Davis, Miller & Mosher
ATTORNEYS United States Patent Office 3,357,195
Patented Dec. 12, 1967

3,357,195
LIQUEFIED GAS TANKER
George R. Knight, Jr., Port Washington, N.Y., Norman W. Penney, Ridgewood, N.J., and Thomas F. Bridges, Port Washington, N.Y., assignors to John J. McMullen, Montclair, N.J.
Filed Apr. 25, 1966, Ser. No. 544,980
3 Claims. (Cl. 62—55)

ABSTRACT OF THE DISCLOSURE

A liquefied gas tanker in which the cargo section of the hull supports a plurality of free standing cryogenic tanks which do not contribute to the strength of the ship. The hull cargo section is specially designed so that the sides and top of the tanks extend above the structural top of the hull in order to lower the free board and ship's depth. The tops and sides of the tanks are insulated and provided with sheathing and flashing members coupled to the hull by a flexible joint in order to protect the tanks from weather and excessive heat transfer.

---

The present invention relates to liquefied gas storage tanks and more particularly to tanks arranged on ships for storing liquefied gas at about ambient pressures.

In the past, tankers of the type described have been built with their hulls and upper deck completely surrounding the cargo tanks. In this way, the tanks are protected from the weather and heat transfer is somewhat controlled.

The present invention provides a new and improved gas tanker design which is less expensive and quicker to build, but which affords the necessary weather and heat transfer protection for the cargo tanks. As one example of the present invention, the cargo section of the hull terminates below the top of the cargo tanks. A metal sheathing covers the insulated top and upper sides of the tank and forms a flashing which projects over the hull. A flexible expansion joint connects the flashing to the hull to provide for vertical tank movement and growth and to provide a vapor and weather-tight seal to the flashing-hull combination. The necessary piping is carried by catwalks supported above the tanks by frames attached to the hull. Thus, the void space volume is reduced and the tank is sufficiently protected from weather conditions, and the tank can thermally expand and contract in all directions without restraint and without stressing the ship's structure.

It is, therefore, an object of the present invention to provide a liquefied gas tanker with the insulated cargo tanks extending above the upper plane of the cargo section of the hull, with a protective sheathing and flexible sealing arrangement covering the tank top and sides.

Other and further objects of the present invention will become apparent with the following detailed description, when taken in view of the appended drawings in which.

Figure 1:
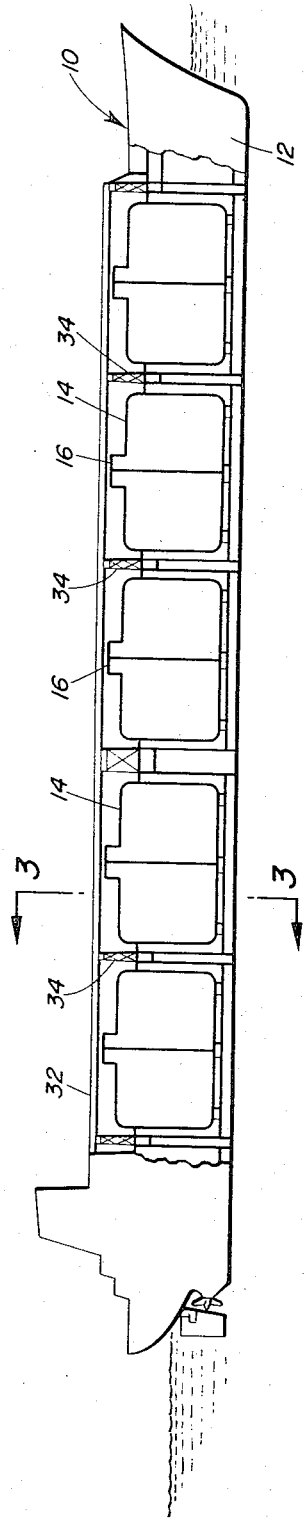
FIG. 1 is a side elevation of a tanker according to the present invention.
Figure 2:
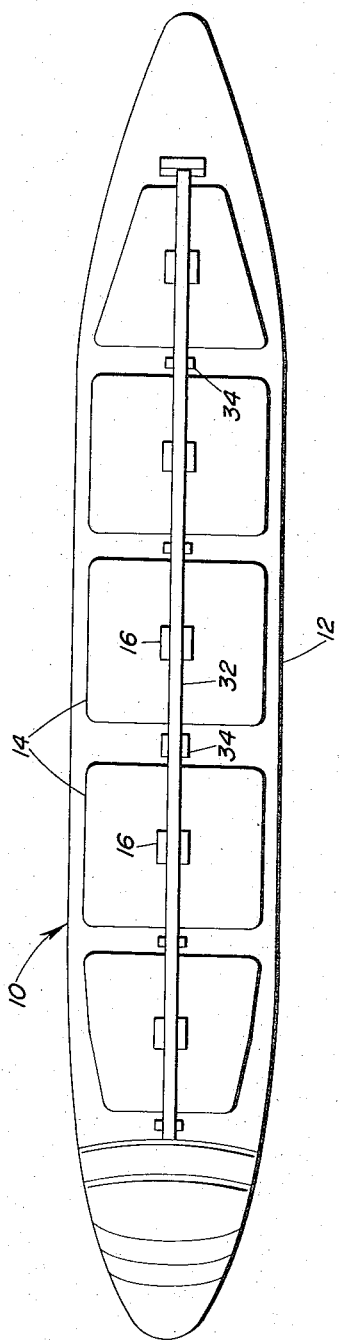
FIG. 2 is a top plan of FIG. 1.
Figure 3:
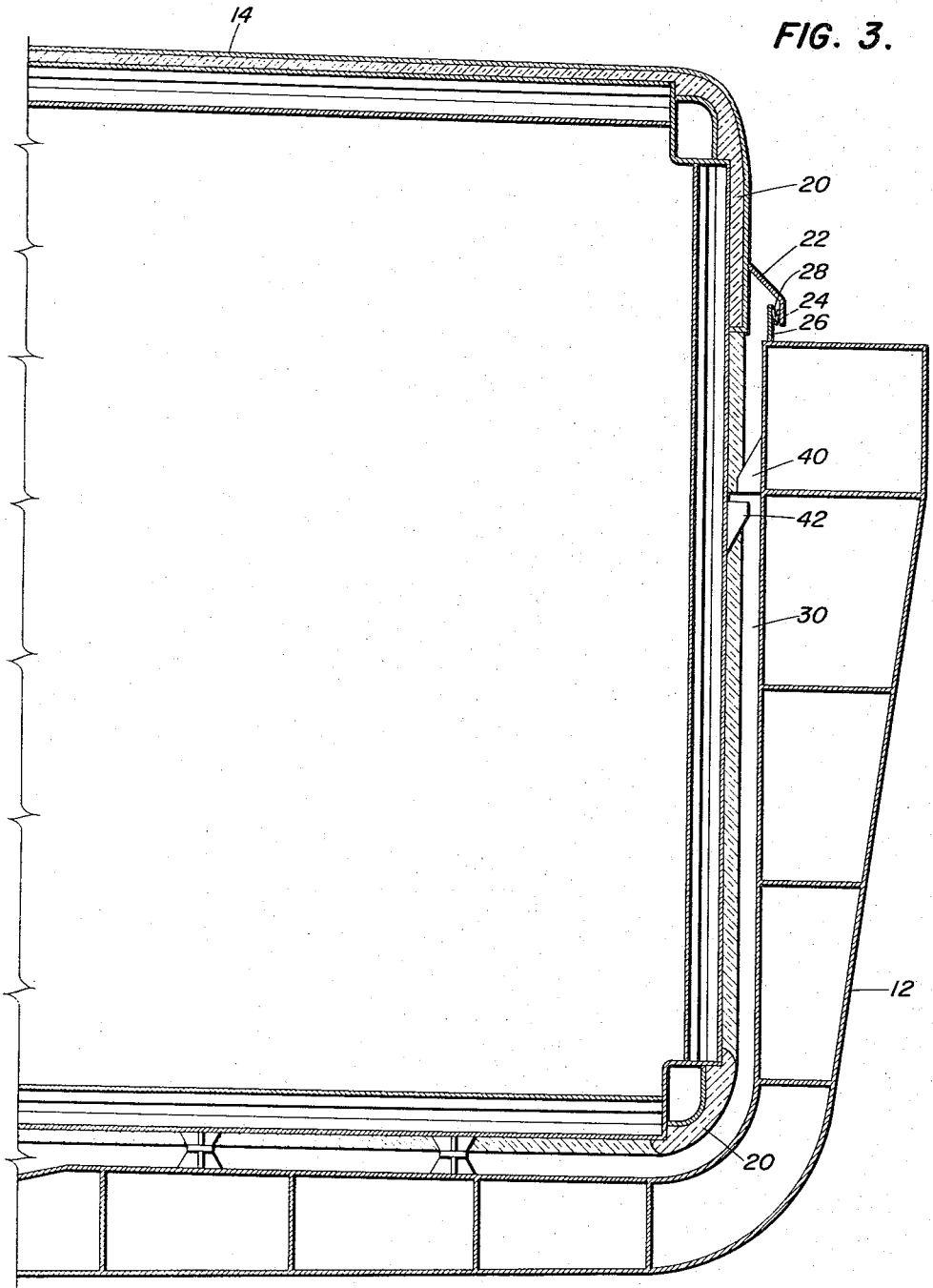
FIG. 3 is a transverse vertical section taken along line 3—3 of FIG. 1.

According to the invention, ship 10 comprises a hull 12, which has a cargo section which supports a plurality, in this case 5, of liquefied gas storage tanks 14. Tanks 14 are preferably a self-supporting, double wall structure and, during use, contains a body of liquefied gas such as methane, ammonia, ethylene, or the like, at about ambient pressure. The details of the tank construction and supporting arrangement within the ship's hull is more fully described in the co-pending patent application entitled, "Method and Apparatus for Cooling and Filling Liquefied Gas Transport and Storage Tanks and Improvements in Said Tanks," filed Mar. 16, 1965, Ser. No. 440,081. Each tank 14 comprises a central upstanding trunk 16 to accommodate the necessary piping for feeding and returning various fluids to and from tank 14. A catwalk and pipe run 32 is supported throughout the length of a cargo section above the tops of tank 14 by a plurality support framework 34 mounted on the parts of hull 12 between tanks 14.

Hull 12 is suitably strengthened for the open deck and has a height in the cargo section such that the top of hull 12 is arranged below the tops of tanks 14. Tanks 14 are blanketed with sheets of insulation and are supported or secured in a manner more fully disclosed in the patent application entitled, "Novel Insulated Tank Configuration," filed April 1, 1966, Ser. No. 539,489. A further buildup of insulation 20 covers the corners and upper sides and top of the tank. In order to further protect the tank, a vapor barrier in the form of fiberglass reinforced plastic or mastic material is sprayed over the entire outer surface of the insulation.

According to the invention, an aluminum sheathing covers the upper surface of the tank insulation, as well as the upper part of the tank sides insulation. In order to afford free vertical movement for tank 14 and to provide a sealing arrangement for the tank-hull combination, an aluminum flashing 22 extends continuously around tank 14. Flashing 22 is connected to the aluminum sheathing and slopes downward and outward therefrom and terminates in a lower flange 24 positioned over the top of hull 12. An upstanding plating 26 is rigidly fixed to the top of hull 12 and is spaced inward from flange 24. The sealing arrangement is completed by a continuous flexible expansion joint 28 having one edge connected to plating 26 and its other edge connected to flange 24. Expansion joint 28 serves to seal the void space 30 between hull 12 and tank 14, so that the void space is gas tight.

Stops 40 are mounted on the inner side of the hull and contact cooperating stops 42 mounted on the tank wall in the event liquid enters the void space 30 and causes the tank to float to an unsafe level.

What is claimed is:
1. A tanker comprising a hull having a cargo section, a plurality of cargo tanks supported by said hull and having cargo housing sides extending upwardly above the structural top of said hull, insulation provided on at least the top and upper sides of the tank above the hull top, and covering means covering the top and being connected to the hull to protect the tank from the weather and wherein said covering means comprises a continuous flashing and a continuous flexible expansion joint having one edge rigid with the hull and its other edge coupled to the flashing to enable the tank to expand and contract generally vertically without restraint.
2. A tanker as set forth in claim 1 wherein said covering means comprises a sheathing arranged to isolate the inside of the hull from the ambient atmosphere and wherein the flashing extends above the top of the structural hull and said expansion joint is positioned over the hull top and has one edge coupled thereto.
3. A tanker as set forth in claim 1 further comprising stop means mounted on the hull and tank to prevent the tank from rising above a predetermined level in the event liquid enters the hull.

References Cited
UNITED STATES PATENTS 2,986,011    5/1961    Murphy _____ 62—55
3,011,321   12/1961    Clauson _____ 62—45

LLOYD L. KING, *Primary Examiner.*